Patented Oct. 25, 1932

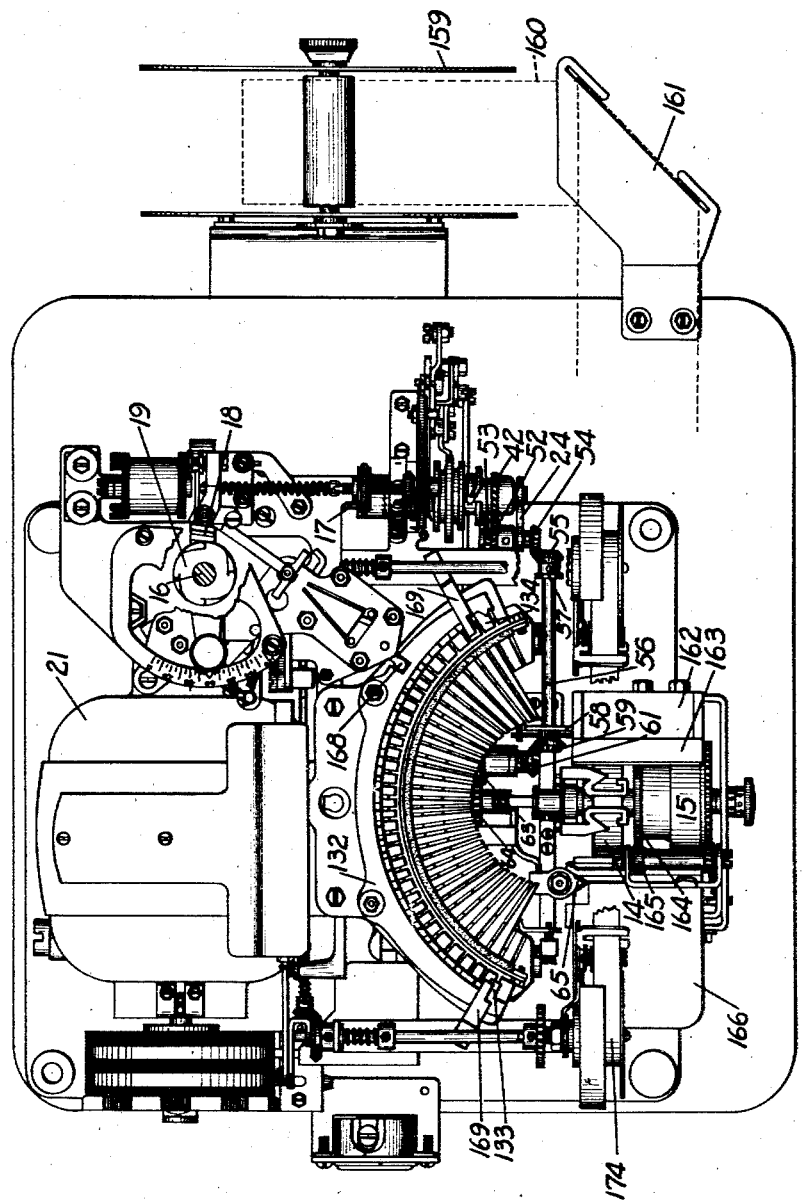

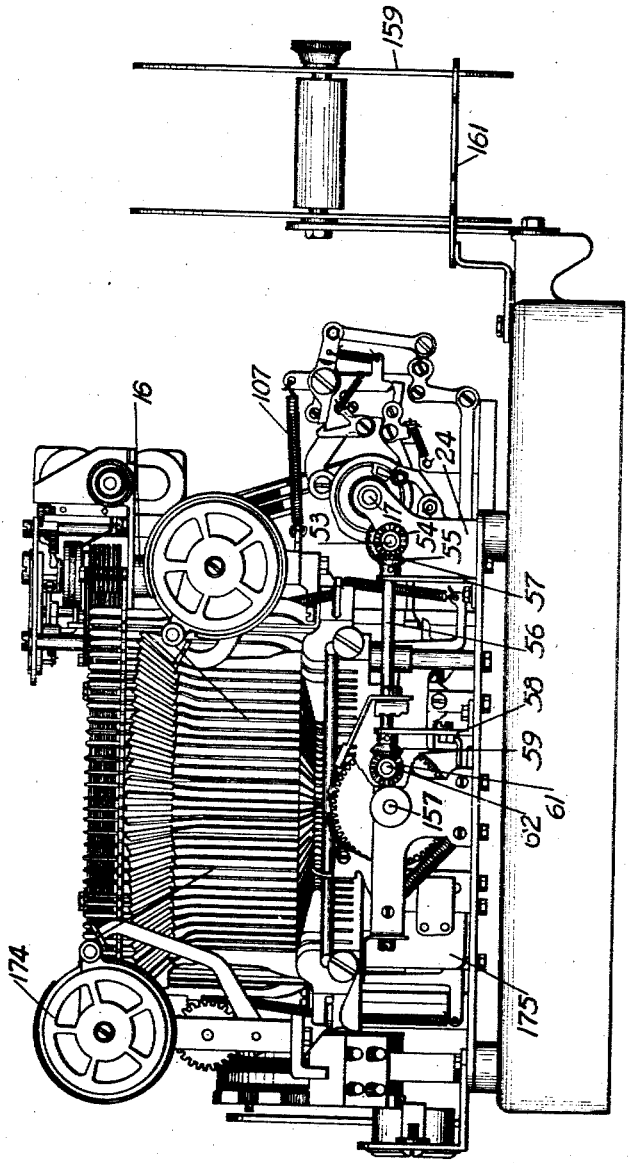

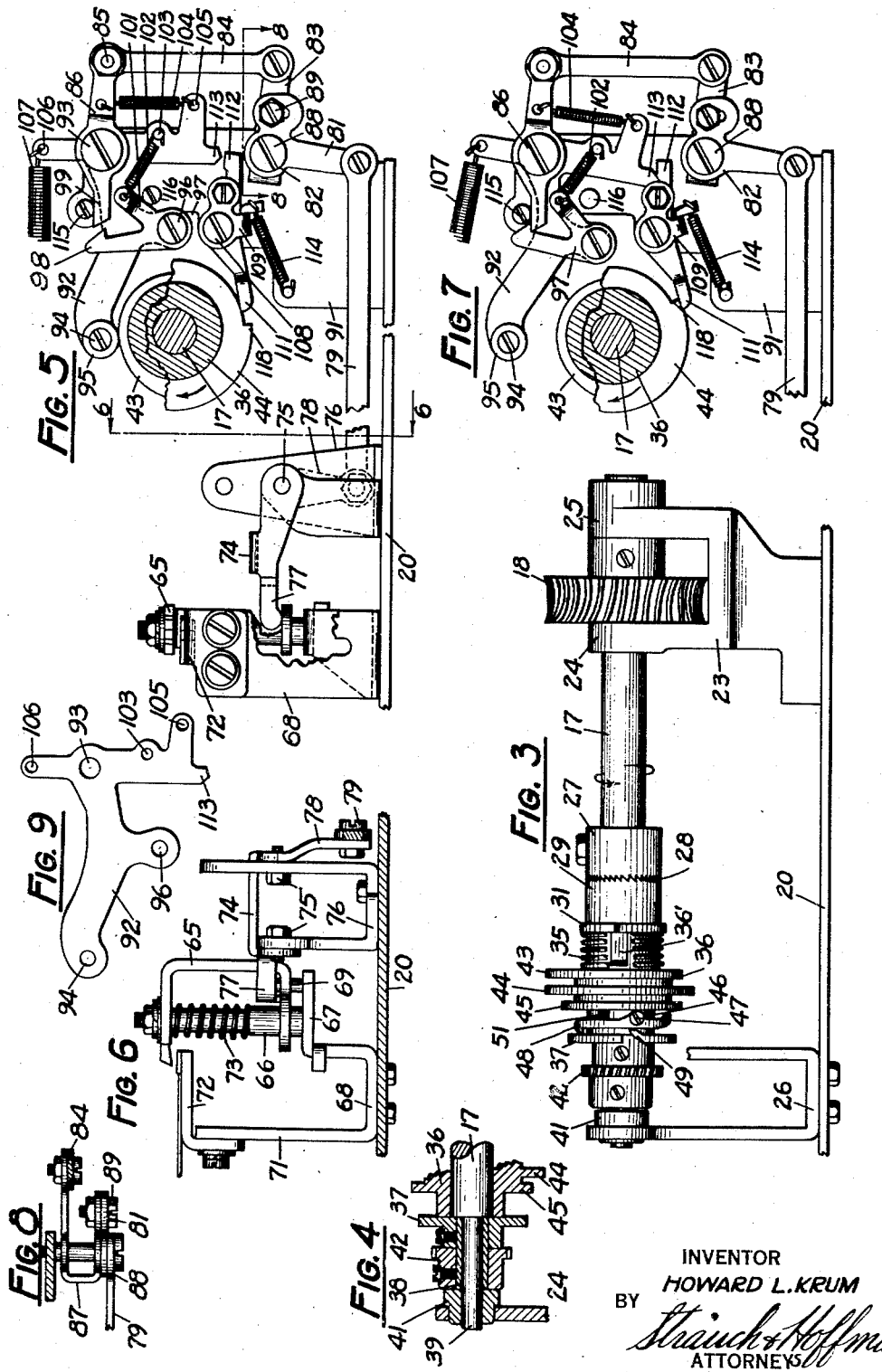

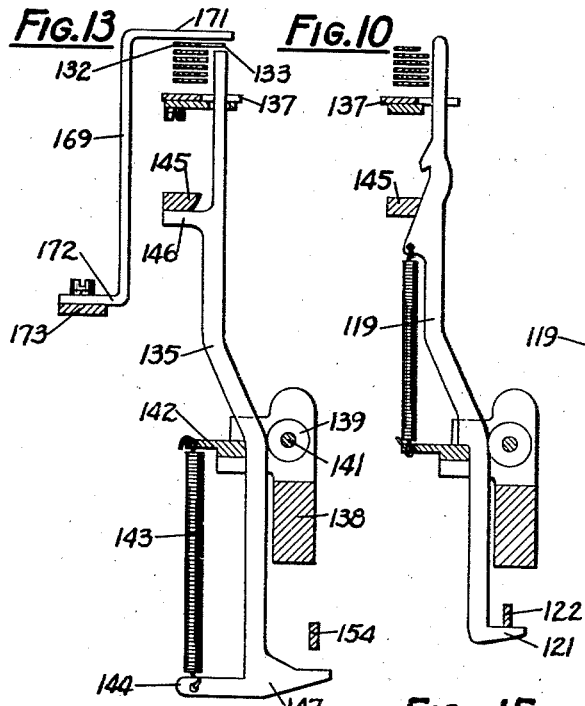

1,884,755

UNITED STATES PATENT OFFICE

HOWARD L. KRUM, OF CHICAGO, ILLINOIS, ASSIGNOR TO TELETYPE CORPORATION, OF CHICAGO, ILLINOIS, A CORPORATION OF DELAWARE

COUPON PRINTER

Application filed October 16, 1930. Serial No. 489,205.

This invention pertains to telegraph receivers, and more particularly to telegraph printers of the permutation code type, the preferred embodiment of the invention hereinafter set forth being in the form of an improvement on telegraph printers of the type disclosed in United States Patent #1,745,633 issued February 4, 1930, to Sterling Morton et al.

At present it is generally the practice in stock exchanges to effect the actual stock or commodity transactions at so-called "posts", located at designated points in an exchange. One such post is provided for each stock or group of stocks, as the case may be, the information regarding the stocks allotted thereto being usually conveyed by a framed card surmounting each "post". Any desired number of such "posts" are provided and are usually distributed uniformly about the floor of the exchange.

Along the walls of the stock exchange hall or room telephone booths are arranged over each of which a signal lamp is exhibited. These booths are let to stock brokers and the telephones are usually connected to said brokers' main offices by private wires. Each broker has one or more representatives stationed at the stock exchange, who receive the orders over the telephone to buy or sell specific blocks of stocks. Usually each representative records the phoned information upon cards of uniform size and then carries them over to the "post" allotted to the particular stock in which he wishes to deal, announces his particular proposition, and endeavors to complete a transaction.

While so engaged his telephone may be ringing and the signal light over his booth signal flashing for another order which must wait for attention, unless he wishes to neglect his present transaction. When business is active material delay in effecting transactions with resultant heavy losses frequently occurs, and because the messages are telephoned and must be accurately received because of financial responsibilities incurred by brokers executing erroneous orders, considerable loss of time and effort occurs.

To minimize labor and to eliminate waste of time and chances, accordingly the present invention has for its primary object the provision of telegraphic printers especially to record the orders or instructions quickly, accurately, automatically and directly upon cards or tickets of uniform size convenient for handling either singly or in small packets without necessitating the presence of a receiving attendant. By use of the present invention the possibility of erroneous transmission of orders is reduced to a minimum and brokers may communicate directly with agents at the exchange. Also broker's representatives may complete present transactions without annoyance and may then return to their booths and pick up the next batch of coupons relating to further transactions which have, in the meantime, accumulated, thereby materially increasing the business a single agent can handle and reducing the cost of transactions correspondingly, while speeding the service.

While especially useful in stock exchanges, the present invention is adaptable to various other uses as for example remote control call-systems or installations for those business enterprises which provide messenger or cab service such as telegraph, photoprinting, and cab companies, hotels and the like wherein the calls or messages received at a central point are transmitted therefrom to the remote branch offices or points where call-slips, coupons, or records may be directly provided for distribution by use of the present invention.

Therefore another object of this invention is to facilitate the dispatching of orders accruing in stock or commodity exchanges and message distribution on call systems by providing a special coupon printer which will record directly communications at distributing points or branch offices upon blanks, cards, or tickets of uniform size convenient for handling either singly or in small packets.

Still another object of this invention is to provide telegraphic printing apparatus wherein the message is received upon a paper web and wherein means are provided for cutting the web automatically into parts of predetermined length.

A further object of the invention is to provide means whereby a predetermined length of recording material is fed through a printing apparatus with every message group of signals and is cut off automatically to predetermined length.

Another feature resides in the fact that the the length of tape or record sheet fed for the minimum coupon in the preferred embodiment of the invention is independent of the minimum length of the message.

Still another object of this invention is to provide novel telegraphic receiving mechanism in which the record strip is cut in response to a "message-end" signal.

A further object is to cut the tape or record strip in a telegraphic receiver in lengths of multiples of a predetermined length unit under the control of the sending device which will effect an index other than a printed record.

Another object is to provide means under the control of the sender for weakening the tape between successive messages in telegraphic receivers.

Further objects of the invention will appear in connection with the preferred embodiment of the invention hereinafter set forth and illustrated in the accompanying drawings, wherein:

Fig. 1 is a plan view of one form of improved receiver embodying the invention.

Fig. 2 is a front elevation of the form of invention shown in Fig. 1.

Fig. 3 is a detail view of the auxiliary shaft that controls the counting mechanism embodied in the preferred form of invention.

Figure 4 is a fragmental section of the auxiliary shaft embodied in the preferred formed form of invention taken near its forward end.

Figure 5 is a detail view of the counting mechanism utilized.

Figure 6 is a sectional view taken on line 6—6 in Figure 5.

Figure 7 illustrates the arrangement of the parts of the counting mechanism illustrated immediately preceding the cutting operation.

Figure 8 is a detail cross sectional view taken on line 8—8 of Figure 5.

Figure 9 is a detail of a punch lever utilized.

Figure 10 is a fragmental vertical view of the auxiliary shaft clutch releasing actuating bar utilized.

Figure 11 is a fragmental plan view of the auxiliary shaft clutch-release mechanism utilized.

Figure 12 is a detail view of the platen unshift actuating bar.

Figure 13 is a detail view of the platen shift actuating bar.

Figure 14 is a detail plan view of the platen shift and unshift mechanism utilized.

Figure 15 is a detail cross section on line 15—15 of Figure 14.

Since the disclosure herein set forth is in the nature of an improvement of printing telegraph receiver disclosed in U. S. Patent #1,745,633 or similar type-bar printer mechanisms operative to properly select the various typebars, move the tape forward, move and reverse the inking ribbon, (as on a standard typewriter), and shift the platen for figure case characters, only so much of the mechanism of said patent will be hereinafter set forth as is necessary to an understanding of the present invention. Reference may be had to said patent for a full understanding of the printer mechanisms not described hereinafter in detail.

The present invention provides a counting mechanism adapted for association with the printer of said Patent 1,745,633 or any similar type of printer, the function of which is to properly time and initiate a cutting operation by "counting" the spaces comprising a predetermined unit length or multiple of unit lengths of coupons preparatory to performing the cutting operation on the receiving tape.

As disclosed in the above mentioned patent, the platen 14, (referring to Figures 1 and 2 in the drawings accompanying this application) over which the paper tape passes from right to left is located in the front and central part of the apparatus. However, the rotating platen used in this invention is of slightly different construction comprising in this instance a shiftable part 14 and a non-shiftable part 15 as will more fully hereinafter appear.

Immediately above the platen is the inking ribbon. The typebars are just back of and above the platen, arranged in a semi-circle for striking downward. Just above and back of the typebars are the code bars, six in number, and semi-circular in shape. The actuating bars are just in front of the code bars and one is pulled into the aligned notches in the code bars when the notches are selectively aligned for a particular letter. When the selecting mechanism aligns the notches in the code bars and the proper pull-bar is pulled thereinto, the operating bail is released and moves upward. The operating bail 145, (Figure 10, Sheet 4) engages a notch in the selected bars pulling them upward, thus causing the selected typebar to print the selected letter.

All the functions performed by the printer are actuated by a main shaft 16 (Figure 1) which is geared to the motor by a worm gear and which is located in a perpendicular position at the rear and to the right. On this shaft are two clutches. The upper one is a friction clutch which drives the receiving cam sleeve, of the selector mechanism while the other is a ratchet clutch which drives an operating cam, thereby imparting motion to the operating bail which in turn performs all the other operations of printing, all as set forth in detail in the above mentioned patent.

Having indicated the well known printing mechanism to which the present invention was particularly adapted, the additional parts of the present invention will now be described in detail.

Driving mechanism

The additional drive mechanism for the present invention comprises a shaft 17 horizontally disposed from front to rear of the machine (Figures 1 and 2) operably connected with and disposed to the right of main shaft 16 by means of worm gear 18 mounted on shaft 17 (Figures 1 and 3) which intermeshes with worm or pinion 19 fixedly mounted on main shaft 16. Power for driving the apparatus is supplied by the printer motor 21 through gearing to main shaft 16 which in turn drives auxiliary shaft 17.

Referring to Figure 3, auxiliary shaft 17 is supported from base plate 20 at the rear on bearing 23 having extensions 24 and 25, between which worm gear 18 is mounted. The forward end of shaft 17 is supported from plate 20 by means of bearing 26.

Fixed to shaft 17 is the driving member 27 of tooth or grab clutch 28, the driven member of which comprises a sleeve 29 slidably mounted on and keyed to shaft 17. Formed on sleeve 29 is a flange 31 (Figure 11) having a side cam surface 32 adapted to engage a fixed cam follower 33, which forms an integral part of clutch release lever 34 operated in a manner that will more fully hereinafter appear. The sleeve member 29 is thus adapted to be held to the left, as viewed in Figure 3, out of engagement with the fixed member 27 against the distending action of helical spring 35 positioned on the end of sleeve 29 between the sleeve member 29 and counter clutch member 36, by the camming action imparted to said sleeve through its cam surface 32 by fixed cam follower 33 (Figure 11).

Counter clutch member 36 is mounted on shaft 17, and is rotatably driven therewith through a splined connection 36' with sleeve member 29 (Figures 3 and 4). Counter clutch member 36 constitutes the driving member of the counter clutch assembly, the driven member 37 of which comprises a flanged hub fixed to the sleeve 38 mounted on the reduced end 39 (Figure 4) of shaft 17. Incidentally, end 39 of shaft 17 is suitably journalled in bushing 41 mounted in bearing bracket 24. Also mounted on sleeve 38 and rotatable therewith is the gear 42. Counter clutch member 36 comprises punch lever operating cam 43, punch lever release cam 44 and detent 45, the functions of which will be hereinafter described.

Appropriately mounted on hub 46 of said member 36 and pivotally connected thereto at 47 is counter clutch pawl 48, adapted to cooperate with laterally disposed tooth 49 on member 37. Pawl 48 is constantly urged into cooperative relationship with tooth 49 by the distending action of helical spring 51.

Bracket 24, Fig. 3, is substantially U-shaped, one arm of which, as already has been noted, supports the front end of shaft 17. Appropriately interposed between the arms of bracket 24 and adapted to intermesh with gear 42 is intermediate gear 52 (Fig. 1) mounted on and driving shaft 53 which is suitably journaled in arms of said bracket 24. Shaft 53 extends beyond the front arm of bracket 24 and has fixed on said extended end bevel gear 54 meshing with and driving bevel gear 55 fixed to one end of shaft 56. Shaft 56 is journaled in brackets 57 and 58, which are in turn fixed to base plate 20. Fixed to the other end of and driving shaft 56 is bevel gear 59 meshing with bevel gear 61 fixed to the front end of the spacing shaft 62 (Figs. 1 and 2). The rotation of spacing shaft 62 to effect the spacing operation and simultaneously feed the tape is accomplished substantially as set forth in the hereinbefore mentioned U. S. Patent #1,745,633.

In this invention the rotation of the platen 14 is controlled either by the spacing mechanism of the apparatus just described or by the counter clutch mechanism. As set forth in Patent #1,745,633 rotative motion is imparted to the platen by the spacing shaft gear 63 and the platen shaft gear 64 so that the tape is moved forward one space during each operation of the spacing ratchet (not shown). Simultaneously, rotative motion is imparted to counter clutch member 37 through its associated gear 42 by reason of the cooperative relationship between shafts 53, 56 and 62 and their associated gears.

During the recording of a message the platen 14 and counter clutch 37 advance step by step in accordance with the usual spacing operation. It will be noted at this point that the counter clutch member 37 and its associated gear 42 rotate on shaft 17 independently of the rotation of the shaft by reason of their fixed relation to sleeve 38, and that their rotation is controlled either by the rotation of the spacing shaft 62, previously described, or by the counter clutch driving member 36 through counter clutch pawl 48. Rotative motion is imparted to the counter clutch member 36, of which pawl 48 is part, through grab clutch member 29 whenever said clutch member is allowed to become engaged with constantly rotating driving member 27, as will hereinafter appear.

Cutting mechanism

Referring to Fig. 1, it will be noted that the tape cutting knife or punch 65 is located immediately to the left of the platen 14. In the present embodiment of this invention punch 65 is adapted to cut a V-shaped notch in the edge of the tape at predetermined intervals. Having reference now to Figs. 5 and 6 sheet 3, wherein the cutting mechanism is clearly illustrated in detail, punch 65 comprises a U-shaped member mounted for vertical reciprocative movement on guide post 66, appropriately mounted on arm 67 of bracket 68 which in turn is fixed to base plate 20. To prevent rotation of punch 65 on post 66, guide pin 69 suitably mounted on arm 67 passes through a locating eye in the lower arm of punch member 65. To the extremity of arm 71 on bracket 68 is mounted die member 72, one end of which is fixed to said arm 71 and which is provided at its free end with a V-shaped notch adapted to serve as a matrix for punch member 65 and to cooperate therewith. Punch 65 is normally held out of engagement with die 72 by the distending action of helical springs 73 suitably mounted on guide post 66.

Reciprocative motion is imparted to punch 65 by the alternating actions of spring 73 and punch operating bail 74, as will hereinafter appear. Bail 74 is a substantially U-shaped member pivotally connected at 75 to platen shaft bearing bracket 76 fixed to base plate 20. Arm 77 of bail 74 is adapted to cooperate with punch 65, and to the end of arm 78 of said bail 74 is pivotally connected one end of punch bail link 79. Referring to Fig. 5, it will be noted that the other end of link 79 is pivotally connected to arm 81 of adjustable bell crank 82. To the end of arm 83 of bell crank 82 is pivotally connected one end of punch lever link 84 the other end of which is pivotally connected at 85 to punch lever extension 86. This train of mechanism is designed to impart oscillatory motion to arm 77 of bail 74 in a manner to be presently described. Incidentally, adjustable bell crank 82 comprises U-shaped member 87 (Fig. 8) and arm 81 which are both pivoted at 88. The angularity between arms 81 and 83 is adjustable by reason of slot and screw adjustment 89.

Counting mechanism

Referring to Figs. 5 and 7 which figures illustrate the counting mechanism, hereinbefore mentioned, and which will now be fully described, auxiliary shaft is shown at 17 and the counter clutch driving member at 36. The group of levers comprising a part of the counting mechanism are appropriately mounted on bracket 91, fixed to base plate 20. Punch lever 92 and punch lever extension 86 are pivoted at a common point 93. To clarify the understanding of Figs. 5 and 7, there is shown in Fig. 9 a detail of punch lever 92, wherein is indicated the pivotal points with the same labels as appear in Figs. 5 and 7. Pivoted at 94 to lever 92 is follower roller 95 which is actuated by cam 43 of counter clutch member 36. Pivoted at 96 on lever 92 is punch lever pawl 97. Pawl 97 comprises latch arm 98, adapted to cooperate with arm 99 of lever 86 as will hereinafter appear, and arm 101 to the extremity of which is secured one end of spring 102 the other end of which is secured at 103 to punch lever 92. Secured to punch lever extension 86 at a point substantially midway between points 93 and 85 is one end of spring 104 the other end of which is fastened at 105 to punch lever 92. To point 106 of punch lever 92 is secured one end of spring 107 the other end of which is fixed to the printer frame.

Pivoted at 108 to bracket 91, is punch lever latch 109, arm 111 of which is adapted to cooperate with cam 44 of counter clutch member 36. Arm 112 of said latch 109 is adapted to cooperate with end 113 of punch lever 92, as will presently appear. Suitably attached to latch 109 to impart clockwise rotation thereto about pivot 108 is spring 114 which is also fixed to bracket 91. In consequence thereof arm 111 is constantly in contact with the periphery of cam 44.

The normal position of the counter mechanism is shown in Fig. 5, and the operative position assumed by the mechanism in response to a message end or special control signal is shown in Fig. 7. Punch lever 92 constantly tends to rotate in a counter-clockwise sense about point 93 due to the tension of spring 107. Lever 86 normally tends to rotate in a clockwise sense under the influence of spring 104, which rotation is limited by stop 115 secured to bracket 91. This action of spring 104 on lever 86 tends to hold punch 65 out of operative relationship with die 72 through the interconnecting levers and links hereinbefore described. Punch lever pawl 97 normally tends to rotate in a clockwise sense under the influence of spring 102, which rotation is limited by stop 116 fixed to bracket 91. The "message-end" signal is a special code combination which, when received, initiates the operation of the cutting mechanism to effect the cutting of the coupon to the predetermined length, as will clearly appear hereinafter.

Clutch release for counting mechanism

Having reference to Figs. 10 and 11, the counting mechanism clutch releases will now be described. A special pull-bar or actuating bar 119 to effect the actuation of the clutch release lever 34 is provided. The construction, selection, and mode of actuation of pull-bar 119 is identical to that fully described in before mentioned U. S. Patent #1,745,633 and the description will not here be repeated in detail. As shown in Figure 10 actuating bar 119 is provided with foot 121 adapted to cooperate with arm 122 of lever 123. Lever 123 is adapted to pivot on stud 124 (Fig. 11) appropriately mounted on the before mentioned bracket 24 and comprises arms 122 and 125. Arm 125 is adapted to cooperate with arm 126 of clutch release lever 34. Lever 34 is pivoted on stud 127 appropriately mounted on bracket 128 which in turn is fixed to base plate 20. Lever 34 is constantly held in operative relation with clutch member 29 by the tension of spring 129, one end of which is secured to lever 34 and the other end to spring post 131 suitably mounted on bracket 128. In the normal rest position of parts follower 33 of lever 34 engages cam surface 32 adjacent the ledge on stop projection holding clutch member 29 at rest out of engagement with clutch member 27.

When the "message-end" signal is received bar 119 is selected and actuated vertically in the manner disclosed in the before mentioned U. S. Patent #1,745,633, which causes end of arm 122 to be raised and end of arm 125 to be lowered due to the rotation of lever 123. The consequent action of arm 125 upon arm 126 of lever 34 causes said lever 34 to rotate against the action of spring 129 raising follower 33 out of engagement with cam surface 32 and the stop ledge of clutch member 29. Clutch member 29 is therefore allowed to engage the driving member 27 due to the distending action of clutch spring 35 (Figures 3 and 11), and by reason of such engagement the rotation of before mentioned counter clutch assembly 36 through a single revolution is initiated.

Counting operation

The operation of the counting mechanism in the performance of the cutting operation will now be described. In operation it will be understood that the message is received by the printer and recorded on the receiving tape in the usual manner set forth in detail in the above mentioned patent and the transmitting operator sends a "message-end" signal only at the completion of each message.

As noted hereinbefore, gear 42 and member 37 of counter clutch assembly 36 are advanced or rotated step-by-step with the platen 14 upon each spacing. This step-by-step rotation continues as long as the received message is being recorded. Assuming that only one-half revolution of platen 14 and clutch member 37 is required to complete the reception of the message, at this point the "message-end" signal will be received. Reception of the "message-end" signal in the manner hereinbefore described causes actuation of bar 119 to initiate a single revolution of clutch members 29 and 36, at the completion of which the cutting operation will be performed as will hereinafter appear. During the rotation of clutch member 36, pawl 48 overtakes tooth 49 of member 37, and completes rotation of clutch member 37 under the influence of power supplied by shaft 17. This action also causes gear 42 associated with member 37 to continue its rotation which, by reason of its interconnection with platen 14, causes said platen to continue its rotation thereby advancing the tape to feed a predetermined length thereof through the machine regardless of the variations in length of the message short of a tape length corresponding to the amount fed by a full revolution of the counting mechanism.

When the message is longer than may be recorded on a length of tape equal to the length fed by a single revolution of the counting mechanism which constitutes the unit length of the coupon, gear 42 will continue to rotate simultaneously with the platen under the influence of the spacing mechanism until the message is completed and upon reception of the "message-end" signal clutch members 29 and 36 will be released for rotation and pawl 48 will then pick up tooth 39 rotating platen 14 to feed a length of tape that will complete a length of coupon which will be a multiple of the unit length.

Cutting operation

It is now apparent how the length of the coupon is automatically controlled in both unit and multiple lengths for short and long messages and the cutting operation will now be described. Since Fig. 5 shows the counting mechanism in its normal or unoperated position and Fig. 7 illustrates same in its operated position prior to performing the cutting operation, the steps intervening between the two illustrated positions will now be described. Referring to Fig. 5, follower roller 95 is normally in contact with the low part of the periphery of cam 43 due to the action of spring 107 on lever 92 which spring tends to rotate said lever 92 in a counter-clockwise sense. It has been noted that spring 114 normally tends to rotate lever 109 in a clockwise sense so that end 111 constantly bears against the periphery of cam 44.

When the rotation of the counter-clutch member 36 is inaugurated, cam 43 due to its conformation causes punch lever 92 to be rotated about pivot 93 in a clockwise sense against the action of spring 107. At the same time pivot 96 is caused to describe an arc away from stop 116 in a path causing pawl 97 to rotate slightly as spring 102 tends to hold said pawl 97 against its stop 116 as a fulcrum until inclined face 117 contacts with inclined end of lever 99. As the rotation of lever 92 continues pawl 97 will clear its stop 116 and inclined face 117 will continue in sliding relation vertically with end of lever 99 until lever 92 has been elevated sufficiently by cam 43 to permit hooked end of pawl 97 to clear the end of lever 99 at which instant the pawl 97 will be allowed to rotate in a clockwise sense under the tension of spring 102 to become engaged through its hooked end to lever 86.

This position of punch lever 92 and pawl 97 is illustrated in Fig. 7. However, while the high part of cam 43 by reason of its dwell still holds lever 92 in its elevated position, the cam 44 is causing the lever 109 to rotate in a counter-clockwise sense, so that end 112 of said lever 109 will engage end 113 of lever 92 and provide a detent therefor. After lever 92 has been elevated, and pawl 97 and latch 99 have become engaged in the manner just indicated, the periphery of cam 43 again drops off to the low point. Lever 92, however, being restrained by detent 112 of lever 109 remains in its elevated position as shown in Figure 7 until released, in the following manner.

In the position shown in Figure 7, cam 43 is positioned so that the lowest point on its periphery is presented to follower roller 95, that is, the point of greatest span between the cam 43 and follower 95, while said follower 95 is restrained as hereinbefore set forth. The purpose of this gap or span is to permit a trip-hammer action to be imparted to cutting knife 65 to effect the cutting operation, as will presently appear. It will also be observed that at this instant the abrupt drop or step 118 in cam 44 is about to reach end 111 of lever 109. This is the position of the counting mechanism immediately previous to the cutting operation. As step 118 passes end 111, lever 109 receives a sudden slight clockwise rotation under the influence of its spring 114 thereby causing end 112 to become disengaged from end 113 of lever 92. Lever 92 is thus free to rotate suddenly in a counter-clockwise sense under the influence of its spring 107 until follower roller 95 again contacts with cam 43. During this motion of lever 92, counter-clockwise rotation is imparted to lever 86 through its engagement with pawl 97.

Upward movement thus is imparted to link 84 which causes bell crank 82 to rotate slightly in a counter-clockwise sense about its pivot 88. Counter-clockwise rotation is thereby imparted through link 79 to bell crank 74 which in turn imparts a sudden downward movement to punch 65 to perform the cutting operation.

The counting mechanism is again restored to its normal position as shown in Figure 5 in the following manner. After lever 86 has rotated in a counter-clockwise sense under the influence of pawl 97 sufficiently to perform the cutting operation, arm 101 of said pawl 97 will engage stop 116 so that the remainder of the downward motion of pawl 97 will cause its hooked end to be tripped or disengaged from the associated end of lever 86. Lever 86, being thus released, is permitted to rotate again in a clockwise sense to its normal position, hereinbefore alluded to, under the influence of spring 104. Punch 65 is now free to return to its upper or unoperative position through the distending action of spring 73.

As the counting mechanism is restored to normal cam surface 32 of clutch member 29 engages follower 33 of trip member 34 (Figure 11) forcing clutch member 29 to the left in Figure 3 disengaging it from clutch member 27. Clutch member 29 will then come to rest with the follower 33 engaging the stop ledge of cam surface 32. The mechanism is now ready for the reception of the next message.

*Platen shift and unshift*

In the present embodiment of this invention the shifting of the platen is accomplished with the aid of a sixth or case control code bar 132 responsive to a case control condition added to each code combination of selecting conditions and mounted above the usual five code bars. The sixth code bar 132, unlike the other code bars, is devoid of notches; but instead is provided with two tooth-like projections 133 and 134 (Figs. 1, 12 and 13) one near each end thereof adapted to be superimposed above the specially provided actuating bars 135 and 136 which actuate the platen shifting mechanism, as will hereinafter appear. Like the type-bar-operating bars disclosed in said Patent 1,745,633, actuating bars 135 and 136 (Figs. 12 and 13) are guided at their upper and lower ends in the slots of the comb bar 137 and of the type bar segment 138, the lower end portions of the bars being arranged between rollers 139 mounted upon the rod 141 and the segmental bar 142.

The actuating bars 135 and 136 are shifted upwardly by vertical springs 143 the upper ends of which are secured to segmental bar 142 and the lower ends secured to projections 144 at the bottom ends of the respective actuating bars. The actuating bars 135 and 136 are normally held in depressed position by the engagement of the striker bar or bail 145 of the printer with the laterally projecting lugs 146 formed on the actuating bars. The lower ends of actuating bars 135 and 136 are also provided with inwardly projecting lugs 147 and 148 respectively, adapted to cooperate with a rocking bail 149 (Figs. 14 and 15) to effect the shifting of the platen, as will presently appear. Said rocking bail 149 is pivotally mounted on brackets 151 and 152 which are in turn fixed to base plate 20. Bail 149 is provided with an upwardly extending arm 153 (Fig. 15) which engages a peripheral groove in the platen sleeve, substantially as shown. Bail 149 is also provided at its ends with arm 154 actuated by bar 135, and arm 155 is actuated by one arm of intermediate lever 156 which is pivotally connected to bracket 157 appropriately mounted to base 20. The other arm of lever 156 is adapted to cooperate with lug 148 of pull-bar 136.

Referring to Fig. 1, it will be observed that the platen assembly comprises slidable roller platen 14, slidably mounted on platen shaft 157, adjacent roller 15 fixed on the end of shaft 157. The construction of roller 15 is essentially as that of the platen roller described in aforementioned Patent #1,745,633 but in the present invention roller 15 serves as a feed and guide roller for the outer edge of wide record tape 160 which is fed from tape reel 159 through guide 161, over platform 162 adjacent to the platen, through guide 163, over platen assembly, between tape feed wheel 164 and pressure wheel 165, and over tape chute 166. Each of the typebars, as is well known, is provided with two characters or type faces, viz., a letter or "lower case" character, and a figure, punctuation mark or "upper case" character. The platen 14 is axially shiftable on shaft 157 and is adapted to be positioned beneath the tape to receive the impact of either typeface on the selected type bar, as will presently appear. Platen 14 is driven by shaft 157 by means of splined connection 167 between platen 15 and platen shaft gear 64.

The position of the platen is governed by the position of the sixth case control code bar 132, which position is in turn controlled by a T-lever 168 (Fig. 1) of the selector mechanism set forth in Patent #1,745,633 under influence of a case control condition added to each code combination of selecting conditions. Assuming that the platen is normally in the "letters" or unshift position and it is desired to print an "upper case" character, a signal corresponding to the selected character is received and translated by the selector mechanism. The sixth code bar 132, therefore, will be moved in a clockwise sense, as viewed in Fig. 1. Tooth or projection 134 thus will be superimposed above pull bar 136, and when bar or bail 145 is actuated to effect the printing operation, in the manner described in Patent #1,745,633, actuating bars 135 and 136 will tend to rise under the influence of their individual springs 143, but bar 136 will be restrained from vertical movement by said projection 134. Bar 135, however, is free to move vertically, since projection 133 has been moved, simultaneously with projection 134, out of the path of said pull-bar 135. Arm 154 of bail 149 thus has been pulled upward so as to rock arm 153 toward the right, as viewed in Fig. 15, at the same time shifting platen 14 into the shift position to effect the printing of "upper case" characters.

Similarly, when it is desired to return or "unshift" the platen to again permit the printing of "lower case" characters the sixth code bar 132 is caused to move in a counterclockwise direction, as viewed in Fig. 1, by a proper case control condition added to the received code combinations of selecting conditions, thus causing projection 133 to be superimposed above bar 135 and moving projection 134 out of the path of bar 136 so that when bail 145 is again actuated, bar 136, and not bar 135, will be permitted to elevate. Thus the vertical movement of bar 136 under the influence of its spring 143 will cause lever 156 to rotate about its pivot 157. Lever 156 by its action upon arm 155 of bail 149 will cause said bail to rock toward the left as viewed in Fig. 15, and thereby restore platen 14 to its normal or "lower case" position.

To resist the pressure of bar 135 or 136 against the sixth code bar 132, when projection 133 or 134 has been superimposed thereabove, rigid restraining members 169, one adjacent to each bar 135 and 136 are provided as shown in Figs. 1, 12 and 13. As is clearly shown in Figs. 12 and 13, member 169 comprises laterally disposed end 171 which serves to absorb the pressure exerted by the pull bar against the sixth code or case control bar 132 and oppositely disposed end 172 is fixed to suitable bracket 173.

The platen shift it will accordingly be seen is effected without disturbing the position of the latter position of the tape, and therefore without interfering with the counting or cutting operation. Furthermore it will be noted that the printing of "letters" and "figures" case characters is effected in offset lines on the tape.

Referring to Fig. 2 it will be observed that ink ribbon spool 174 is elevated to provide clearance for the manipulation of the tape in severing the coupons.

There is also provided a receptacle or chad box 175 (Fig. 1) adapted to be removably inserted between the vertical arms of bracket 68 (Fig. 6) and disposed below die 72 to receive the chips cut from the edge of the tape.

From the foregoing description it will be seen that this invention provides telegraphic printing apparatus which comprises simple and accurate means for controlling the length of recording material or coupons and printing figures and letters characters on offset lines with respect to each other. Although a preferred adaptation of the invention has been disclosed it will be understood that other applications thereof to other types of mechanisms well known in the art are within the scope of this invention and it is intended to limit this invention only as indicated in the appended claims.

Accordingly what is desired to be secured by Letters Patent and is claimed as new is:

1. In a printing telegraph machine, a printing mechanism, a paper strip, a main paper feed mechanism actuated at each printing operation to feed said strip forward in the direction of its length one letter space, an auxiliary paper feed mechanism, a single magnet, said magnet being the sole electro-responsive means for controlling the operations of said mechanisms, and means operable in cycles for driving said auxiliary paper feed mechanism to insure feeding of a predetermined length of paper through the machine.

2. In a printing telegraph machine, a printing mechanism, a record strip, a main paper feed mechanism actuated at each printing operation to advance said record strip forward in the direction of its length one letter space, an auxiliary paper feed mechanism, and a fixed rotation clutch mechanism for driving said auxiliary paper feed mechanism to cause feeding of a length of paper through the machine in the same direction by the integral operation of said main and said auxiliary mechanisms.

3. In a printing telegraph machine, a printing mechanism, a main paper feed mechanism, an auxiliary paper feed mechanism, solely mechanical means operable in cycles for driving said auxiliary paper feed mechanism to cause feeding of a predetermined length of paper by the integral action of said mechanisms through the machine, and means adapted to engage with the paper for indicating the total length thereof fed by the combined action of said mechanisms.

4. In a printing telegraph machine, a selecting mechanism, a printing mechanism, a platen coacting with the printing mechanism, a record strip, means actuated at each printing operation to feed said strip forward in the direction of its length one letter space, and auxiliary means controlled by said selecting mechanism through solely mechanical connections for continuously advancing said strip independently of the printing operation a plurality of letter spaces through the machine in the same direction.

5. In a printing telegraph machine, a printing mechanism, a paper feed mechanism, means for feeding the paper one letter space in response to each printing signal, auxiliary means including a bail member for feeding the paper in the same direction a variable number of letter spaces, and means operable in predetermined cycle in response to a predetermined signal to drive said auxiliary feeding means so that the total length of paper fed by both of said paper feeding means will be the same length or a multiple of the same length for each cycle of operation.

6. In a printing telegraph machine, a printing mechanism, a paper feed mechanism, means for feeding the paper one letter space in response to each printing signal, auxiliary means including a bail member for feeding the paper in the same direction a variable number of letter spaces, and a clutch mechanism operable in a predetermined cycle in response to a predetermined signal to operate said auxiliary means so that the total length of paper fed by both of said paper feeding means will be the same length or a multiple of the same length for each cycle of operation.

7. In a printing telegraph machine, a selecting mechanism, a printing mechanism, a platen coacting with said printing mechanism to cause printing of letters and figures in offset lines with relation to each other and across which a paper extends, a shaft for said platen, a main shaft geared to said platen shaft, means actuated by each printing operation to rotate said platen shaft to advance said paper a single letter space, an auxiliary paper feed operating shaft geared to said main paper feed shaft, a source of power, a clutch for connecting said source of power to said auxiliary paper feed operating shaft, means controlled by said selecting mechanism for effecting engagement of said clutch to operate said auxiliary paper feed operating shaft independently of said printing operation to continuously advance the paper a number of letter spaces, and means for automatically effecting disengagement of said clutch after a predetermined movement of said paper, to discontinue the operation of said auxiliary paper feed operating shaft.

8. In a printing telegraph machine, a selecting mechanism, a printing mechanism, a paper strip, a platen coacting with said printing mechanism across which said paper strip extends, a paper feed shaft, a main operating shaft geared to said platen shaft, means actuated by each printing operation to rotate said paper feed shaft to advance said paper forward in the direction of its length a single letter space, an auxiliary operating shaft geared to said paper feed shaft, solely mechanical means controlled by said selecting mechanism for operating said auxiliary operating shaft independently of said printing operation to continuously advance the paper a number of letter spaces in the same direction, and means for automatically discontinuing the operation of said auxiliary operating shaft after a predetermined movement of said paper in response to the movement of both said main and auxiliary operating shafts.

9. In a printing telegraph machine, a selecting mechanism, a printing mechanism, a paper strip, a platen coacting with said printing mechanism across which said paper strip extends, a shaft for said platen, a main paper feed shaft geared to said platen shaft, means actuated by each printing operation to rotate said main paper feed shaft to advance said paper forward in the direction of its length a single letter space, an auxiliary paper feed operating shaft geared to said main paper feed shaft, a source of power, a clutch for connecting said source of power to said auxiliary paper feed operating shaft, solely mechanical means controlled by said selecting mechanism for effecting engagement of said clutch to operate said auxiliary paper feed operating shaft independently of said printing operation to continuously advance the paper a number of letter spaces in the same direction, and means for automatically effecting disengagement of said clutch after a predetermined movement of said paper, to discontinue the operation of said auxiliary paper feed operating shaft.

10. In a printing telegraph machine, a platen, a printing mechanism, a paper feed mechanism for advancing paper in one direction past the printing position, means responsive to received signals to print "letters" characters in one line and "figures" characters in another line on said paper and to advance the paper one letter space, and means including a bail member responsive to a predetermined signal to advance the paper a plurality of letter spaces in the direction of the line of printing.

11. In a printing telegraph machine, a selecting means, a printing means, a single magnet, a paper feed means for advancing paper in a single direction past the printing position, means for printing a plurality of spaced messages on said paper with the figures and letters in relatively offset lines; and means responsive to a predetermined code signal for spacing the paper a plurality of letter spaces intermediate messages, said magnet being the sole electro-responsive instrumentality for controlling the operations of each of said means.

12. In a printing telegraph machine, a selecting mechanism, a printing mechanism, a paper feed mechanism for advancing paper in a single direction past the printing position, means for printing a plurality of spaced messages on said paper, and solely mechanical means controlled by said selecting mechanism for spacing the paper a plurality of letter spaces intermediate messages, so that the first character of each message will be spaced a predetermined distance from the first character of the preceding message.

13. In a printing telegraph machine, a printing mechanism, a paper feed mechanism, means for feeding the paper one letter space in response to each printing signal, means to cause printing of letters and figures in offset lines on the paper, means for feeding the paper in the same direction a variable number of letter spaces in response to a predetermined paper feeding signal, means including a bail member for controlling the variable number of letter spaces to be supplied so that the total length of paper fed by both of said paper feeding means will be the same length or a multiple thereof for each cycle of operation, and means actuated to mark the paper to indicate the total length of paper fed by both of said paper feeding means.

14. In a printing telegraph machine, a selecting mechanism, a printing mechanism, a platen co-acting with the printing mechanism, a record strip, means actuated at each printing operation to advance said strip one letter space, solely mechanical auxiliary means controlled by said selecting mechanism in response to a predetermined signal for continuously advancing said strip a plurality of letter spaces through the machine in the same direction, and means for marking said strip at the conclusion of the operation of said auxiliary means.

15. In a printing telegraph machine, an auxiliary paper feeding mechanism controllable from a common source with said telegraph machine, a cutting means, a system of levers interconnecting said mechanism and said means, said cutting means operative through said system of levers for automatically incising the paper at multiple-unit lengths.

16. In a printing telegraph machine, a printing mechanism, a paper strip, a paper feeding means for advancing said strip forward in the direction of its length at each printing operation, an auxiliary feeding means including a cyclically operable bail member controllable from a common electro-responsive means with said telegraph machine for supplementing the advancing of the paper toward a predetermined ensuing unit length, and a cutting means for automatically incising the paper.

17. The combination with a printing telegraph machine including a printing mechanism, paper spacing mechanism, and paper supporting means, of an auxiliary paper spacing means, including solely mechanical feeding mechanism and incising means for advancing and cutting said paper at a predetermined ensuing unit length.

18. In a tape printing telegraph machine, a selecting mechanism operable from received telegraphic impulses, a printing mechanism controlled by said selecting mechanism, a tape spacing mechanism cooperating with said printing mechanism for advancing said tape forward in the direction of its length at each printing operation, determining means for marking said tape, and solely mechanical auxiliary spacing mechanism for advancing said tape to ensuing unit lengths and actuating through solely mechanical connections said determining means whereby said tape may be marked for disjunction.

19. The combination with a telegraph tape printing machine of an auxiliary spacing and marking mechanism including an auxiliary shaft, a source of power for driving said shaft, means operable by said shaft through solely mechanical connections for actuating a marking means, a marking means in the path of said tape, tape advancing means, and means whereby said auxiliary spacing and marking means is controlled for selective performance from a common source of impulses with said telegraph printing machine.

20. In a printing telegraph machine, an auxiliary paper feeding mechanism controllable from a common electro-responsive source with said telegraph machine, and means for automatically marking the paper at unit multiple lengths, said mechanism including cam means for establishing said marking means in operative position, and additional cam means for effecting the instantaneous and timed operation of said marking means so as not to disarrange the normal letter spacing operation of said machine.

21. In a printing telegraph machine having paper spacing mechanism, an auxiliary paper spacing mechanism, marking means co-operative with said auxiliary spacing mechanism for automatically marking the paper at unit multiple lengths, said auxiliary spacing mechanism including cam means for establishing said marking means in operative position, and additional cam means for effectuating the instantaneous and timed operation of said marking means so as not to disturb the normal letter spacing performance of the machine.

22. In a printing telegraph machine, an auxiliary paper feeding mechanism controllable from a common electro-responsive source with said telegraph machine and paper marking means, said mechanism including means responsive to the normal paper spacing operation of the machine, and means adapted to supervene said last mentioned means to effect the operation of said marking means at unit multiple lengths.

23. In a printing telegraph machine, an auxiliary paper feeding mechanism controllable from a common electro-responsive source with said telegraph machine, means for marking the paper, a main operating lever, mechanical interconnection between said lever and said means, cam means for actuating said lever to operative position to establish said interconnection, and means to maintain said lever in said operative position and effect the timed release of said lever to effectuate the marking operation at unit multiple lengths so as not to disarrange the normal spacing operation of said machine.

24. In a printing telegraph machine having paper spacing mechanism, an auxiliary paper spacing mechanism, and marking means cooperative with said auxiliary spacing mechanism, said auxiliary mechanism including means responsive to the normal paper spacing operation of the machine, and means to supervene said last mentioned means to effect the operation of said marking means at unit lengths.

25. In a printing telegraph machine, an auxiliary paper feeding mechanism controllable from a common source with said telegraph machine, cutting means for automatically incising the paper at multiple unit lengths, said mechanism including means responsive to the normal paper spacing operation of the machine, and means to supervene said last mentioned means to effect the operation of said cutting means.

26. In a printing telegraph machine, a printing mechanism, a paper feed mechanism, means for feeding the paper one letter space in response to each printing signal, and an auxiliary paper feeding means including means responsive to said first mentioned means, and means responsive to a predetermined paper spacing signal to supervene said last mentioned means to feed the paper in the same direction a variable number of letter spaces so that the total length of paper fed by both of said paper feeding means will be the same length or multiples of the same length for each cycle of operation.

27. In a printing telegraph machine, a platen, a printing mechanism, a paper feed mechanism for advancing paper in one direction past the printing position, means responsive to received signals to print letters characters in one line and figures characters in another line on said paper and to advance the paper one letter space, and mechanism responsive to a predetermined signal including means responsive to said first mentioned means, and means to supervene said last mentioned means to advance the paper a plurality of letter spaces in the direction of the line of printing.

28. In a printing telegraph machine, a selecting mechanism, a printing mechanism, a shiftable platen co-acting with the printing mechanism, a record strip, means actuated at each printing operation to advance said strip one letter space, marking means, an auxiliary means controlled by said selecting mechanism in response to a predetermined signal for continuously advancing said strip a plurality of letter spaces through the machine in the same direction, said auxiliary means including means responsive to said first mentioned means, and means to supervene said last mentioned means to effect the operation of said marking means.

29. In a device of the character described including a telegraph selecting mechanism, a printing mechanism controlled by said selecting mechanism, a source of power for operating said printing mechanism, a paper supplying means for supporting and conveying continuous paper tape, a spacing mechanism for advancing the tape at each printing operation, a marking mechanism, an auxiliary spacing means supplementing said spacing mechanism for advancing the tape to ensuing multiple unit lengths controlled by said selecting mechanism, said auxiliary mechanism including an element responsive to said spacing mechanism, and means to supervene said element whereby the length of tape is determined for disjunction.

30. In a printing telegraph machine, an auxiliary paper feeding mechanism controliable from a common electro-responsive source with said telegraph machine, means for marking the paper, a system of levers adapted to interconnect said mechanism and said means, said mechanism including means to establish said interconnection, and means for effecting the instantaneous and timed operation of said marking means at a predetermined ensuing unit length of paper so as not to disarrange the normal spacing operation of said machine.

31. The combination with a telegraph tape printing machine of an auxiliary spacing and marking mechanism including an auxiliary shaft, a source of power for driving said shaft, means operable by said shaft for actuating a marking means, a marking means in the path of said tape, tape advancing means, means whereby said auxiliary spacing and marking mechanism is controlled for selective performance from a common source of impulses with said telegraph printing machine, an element in said first mentioned means responsive to said tape advancing means, and further means in said first mentioned means adapted to supervene said element to effect the marking of the tape in unit multiple lengths.

In testimony whereof I affix my signature.

HOWARD L. KRUM.